United States Patent [19]

Goko et al.

[11] Patent Number: 4,534,953
[45] Date of Patent: Aug. 13, 1985

[54] PROCESS FOR PREPARING SOLID TITANIUM TRICHLORIDE USEFUL FOR THE POLYMERIZATION OF AN α-OLEFIN

[75] Inventors: Nobuaki Goko; Yumito Uehara, both of Kurashiki, Japan

[73] Assignee: Mitsubishi Chemical Industries, Ltd., Tokyo, Japan

[21] Appl. No.: 508,906

[22] Filed: Jun. 29, 1983

[30] Foreign Application Priority Data

Jul. 13, 1982 [JP] Japan ................ 57-121745
Jul. 15, 1982 [JP] Japan ................ 57-123698

[51] Int. Cl.$^3$ ............................................. C01G 23/02
[52] U.S. Cl. ................................ 423/492; 502/227; 585/524
[58] Field of Search ................ 423/492; 502/227

[56] References Cited

U.S. PATENT DOCUMENTS

| | | | |
|---|---|---|---|
| 3,769,233 | 10/1973 | Hermans et al. | 423/492 |
| 3,979,372 | 9/1976 | Bend et al. | 423/492 |
| 4,060,593 | 11/1977 | Kazuo et al. | 423/492 |
| 4,195,069 | 3/1980 | Kortbeek et al. | 423/492 |
| 4,305,920 | 12/1981 | Hasuo et al. | 423/492 |
| 4,434,081 | 2/1984 | Takahashi et al. | 502/227 |

FOREIGN PATENT DOCUMENTS 52-91794  8/1977  Japan ................ 423/492

*Primary Examiner*—H. T. Carter
*Attorney, Agent, or Firm*—Oblon, Fisher, Spivak, McClelland & Maier

[57] ABSTRACT

A process for preparing solid titanium trichloride useful for the polymerization of an α-olefin, which comprises precipitating violet-colored fine solid particles of titanium trichloride at a temperature of not higher than 150° C. from a liquid of titanium trichloride liquefied in the presence of an ether, characterized in that after the amount of the precipitated violet-colored fine solid particles of titanium trichloride reaches at least 80% based on the total amount of titanium trichloride in the system, titanium tetrachloride is added in an amount within a molar ratio of from 0.2 to 10 based on the total amount of titanium trichloride in the system, followed by ageing at a temperature of from 60° to 120° C.

12 Claims, No Drawings

PROCESS FOR PREPARING SOLID TITANIUM TRICHLORIDE USEFUL FOR THE POLYMERIZATION OF AN α-OLEFIN

The present invention relates to a method for preparing solid titanium trichloride useful as a catalytic component for the polymerization of an α-olefin. More particularly, the present invention relates to a process for preparing violet-colored fine solid particles of titanium trichloride which are obtainable by subjecting a liquid containing titanium trichloride solubilized in the presence of an ether, to precipitation treatment at a temperature of not higher than 150° C.

As catalytic components which have been widely used for stereospecific polymerization of an α-olefin, especially propylene or butene-1, there may be mentioned:

(1) titanium trichloride obtained by reducing titanium tetrachloride with hydrogen, followed by pulverization in a ball mill for activation;
(2) a titanium trichloride composition obtained by reducing titanium tetrachloride with metallic aluminum followed by pulverization in a ball mill for activation; and
(3) a titanium trichloride composition obtained by reducing titanium tetrachloride with an organic aluminum followed by heat treatment.

However, such titanium trichloride and titanium trichloride compositions are not adequately satisfactory with respect to the catalytic activities and the stereospecificity. Not only that a step for the removal of the catalyst residue from the polymer and a step for the removal of an amorphous polymer which forms abundantly as a by-product, are required, but also the utilization rate of the starting material monomer is low. Thus, their industrial usefulness is rather low.

As an improvement of the process for producing these titanium trichloride compositions, it is known to obtain violet-colored fine solid particles of titanium trichloride by subjecting a liquid containing titanium trichloride liquefied in the presence of an ether to precipitation treatment at a temperature of not higher than 150° C.

Further, for example, Japanese Examined Patent Publications No. 8451/1980, No. 8452/1980 and No. 8003/1980 disclose a method for precipitating violet-colored fine solid particles of titanium trichloride by adding a Lewis acid to liquefied titanium trichloride. Furthermore, Japanese Examined Patent Publication No. 41040/1979 discloses a method for precipitating solid titanium trichloride by adding a Lewis acid and controlling the temperature condition. Still further, Japanese Examined Patent Publication No. 8931/1980 discloses a process for precipitating solid titanium trichloride by controlling the temperature condition without using any freeing agent.

Titanium trichloride obtained by these methods is superior in both the catalytic activity and the stereospecificity and makes it possible to realize a simple process wherein a step for the removal of the catalyst residue from the polymer and a step for the removal of an amorphous polymer as a by-product are eliminated.

However, in a simple process wherein no removal of the amorphous polymer formed as a by-product is conducted, the stereospecificity thereby attainable is not yet adequate for certain commercial products, and it will be required to further improve the stereospecificity. For instance, it will be required to conduct preliminary polymerization with use of a small amount of propylene in the presence of the catalyst containing titanium trichloride, or to add a substantial amount of a third component comprising one or more electron donative compounds to the polymerization system.

For instance, it has been proposed to add an ester compound. In the Japanese Unexamined Patent Publication No. 116626/1980, a method is disclosed wherein an ester compound represented by the general formula II of the present invention is added.

Further, Japanese Patent Application No. 134769/1981 discloses a method wherein an ester compound represented by the general formula I of the present invention is added.

According to the above-mentioned two methods, a polyolefin composition having fairly good quality is obtainable. However, the present inventors have conducted extensive researches to obtain a polyolefin composition having better quality, and as a result, have accomplished the present invention.

Namely, the present invention provides a process for preparing solid titanium trichloride useful for the polymerization of an α-olefin, which comprises precipitating violet-colored fine solid particles of titanium trichloride at a temperature of not higher than 150° C. from a a liquid containing titanium trichloride liquefied in the presence of an ether, which process is characterized in that after the amount of the precipitated violet-colored fine solid particles of titanium trichloride reaches at least 80% based on the total amount of titanium trichloride in the system, titanium tetrachloride is added in an amount within a molar ratio of from 0.2 to 10 based on the total amount of titanium trichloride in the system, followed by ageing at a temperature of from 60° to 120° C.

The present invention also provides a process for preparing solid titanium trichloride useful for the polymerization of an α-olefin, which comprises precipitating violet-colored fine solid particles of titanium trichloride at a temperature of not higher than 150° C. from a liquid containing titanium trichloride liquefied in the presence of an ether, which process is characterized in that after the amount of the precipitated violet-colored fine solid particles of titanium trichloride reaches at least 80% based on the total amount of titanium trichloride in the system, titanium tetrachloride is added in an amount within a molar ratio of from 0.2 to 10 based on the total amount of titanium trichloride in the system, and after the amount of the precipitated violet-colored fine solid particles of titanium trichloride reaches at least 60% based on the total amount of titanium trichloride in the system, an ester compound represented by the general formula:

where each of $R^1$ and $R^2$ is a hydrogen atom or an alkyl group having from 1 to 3 carbon atoms and $R^3$ is an alkyl group having at least 6 carbon atoms, and/or an ester compound represented by the general formula:

where each of $R^4$ and $R^5$ is a hydrocarbon residue, provided that the sum of the carbon atoms in $R^4$ and $R^5$ is at least 10, is added.

Now, the present invention will be described in detail with reference to the preferred embodiments.

The ether to be used for the preparation of the liquid containing titanium trichloride is an ether which is soluble in a hydrocarbon solvent. It is usually selected from ethers represented by the general formula $R^6$—O—$R^7$ where $R^6$ and $R^7$ may be the same or different hydrocarbon residues.

Each of $R^6$ and $R^7$ in the general formula includes an alkyl group, preferably a straight chained alkyl group, such as ethyl, propyl, butyl, amyl, hexyl, heptyl, octyl, decyl or dodecyl; an an alkenyl group, preferably a straight chained alkenyl group, such as butenyl, octenyl or decenyl; an aryl group such as tolyl, xylyl or ethylphenyl; and an aralkyl group such as benzyl. Preferred are a dialkylether, a dialkenylether and an alkylalkenylether. As specific examples, there may be mentioned diethylether, di-n-propylether, di-n-butylether, di-n-amylether, di-n-hexylether, di-n-heptylether, di-n-octylether, di-n-decylether, di-n-dodecylether, n-amyl-n-butylether, n-butyl-n-octylether, n-propyl-n-hexylether, bis(1-butenyl)ether, bis(1-octenyl)ether and propyl-1-butenylether.

For the preparation of the liquid containing titanium trichloride in the presence of such an ether, the following two methods may usually be employed.

(A) A method wherein titanium tetrachloride is used as the starting material, and it is reduced with an organic aluminum compound in the presence of an ether and, if necessary, a proper solvent.

(B) A method wherein solid titanium trichloride is used as the starting material, and it is treated with an ether, if necessary, in the presence of a proper solvent.

Referring to the method (A), the organic aluminum compound to be used for the reduction includes compounds represented by the general formula $AlR_n^8X_{3-n}$ where $R^8$ is a hydrocarbon residue having from 1 to 20 carbon atoms, n is a number of 1 to 3, and X is a halogen atom. Preferred are compounds wherein $R^8$ in the general formula is an alkyl group having from 1 to 10 carbon atoms, such as methyl, ethyl, propyl, butyl, pentyl, hexyl or octyl. Specifically, there may be mentioned a trialkyl aluminum such as triethyl aluminum, tripropyl aluminum or tributyl aluminum; a dialkyl aluminum monohalide such as dimethyl aluminum monochloride, diethyl aluminum monochloride, dipropyl aluminum monochloride or diethyl aluminum monobromide; and an alkyl aluminum sesquihalide such as ethyl aluminum sesquichloride; and an alkyl aluminum dihalide such as methyl aluminum dichloride or ethyl aluminum dichloride.

The preparation of the liquid according to the method (A) may be conducted by the following specific methods.

(a) A method wherein the organic aluminum compound is added to a homogeneous liquid comprising titanium tetrachloride and the ether, or the order for the addition is reversed.

(b) A method wherein a homogeneous liquid comprising the organic aluminum compound and the ether is added to titanium tetrachloride, or the order of the addition is reversed.

(c) A method wherein a homogeneous liquid comprising the organic aluminum compound and the ether is added to a homogeneous liquid comprising titanium tetrachloride and the ether, or the order of the the addition is reversed.

(d) A method wherein the operation of the above (a) to (c) is carried out at a temperature of not higher than $-30°$ C. and then the temperature is raised to a predetermined level.

The temperature for the treatment is usually selected within a range of from $-30°$ to $35°$ C., preferably from $0°$ to $35°$ C.

With respect to the amounts of the respective components, the organic aluminum compound is used in an amount within a range of from 1:0.1 to 1:50, preferably from 1:0.3 to 1:10 as represented by the molar ratio of titanium in the titanium tetrachloride:the hydrocarbon group ($R^8$ in the general formula) in the organic aluminum compound, and the ether is used in an amount within a range of from 1:0.05 to 1:5, preferably from 1:0.25 to 1:2.5 as represented by the molar ratio of the ether:the titanium tetrachloride.

Further, it is preferred that at the time of the preparation of the liquid or after the preparation of the liquid, a suitable solvent, for instance, a hydrocarbon solvent or a halogenated hydrocarbon solvent, is present in an amount at least twice the amount of the ether. As the hydrocarbon solvent, there may be mentioned a saturated aliphatic hydrocarbon such as n-pentane, n-hexane, n-heptane, n-octane, n-dodecane or liquid paraffin; an alicyclic hydrocarbon such as cyclohexane or methylcyclohexane; an aromatic hydrocarbon such as benzene, toluene or xylene; and a halogenated hydrocarbon such as chlorobenzene, bromobenzene or o-, m- or p-dichlorobenzene.

Practically, the solvent is optionally selected mainly depending upon the type of the ether to be used. For instance, when diethyl ether is used, a halogenated hydrocarbon solvent or a mixture of a halogenated hydrocarbon solvent with a hydrocarbon solvent is chosen. When an ether represented by the above-mentioned general formula wherein at least one of $R^6$ and $R^7$ is an alkyl group or an alkenyl group having from 3 to 5 carbon atoms is used, an aromatic hydrocarbon solvent is preferably chosen and then an alicyclic hydrocarbon solvent is chosen. Further, when an ether wherein $R^6$ or $R^7$ is an alkyl group or an alkenyl group having at least 6 carbon atoms is used, it is preferred to use a saturated aliphatic hydrocarbon solvent.

Further, at the time of reducing titanium tetrachloride with the organic aluminum compound in the presence of an ether, a small amount of iodine, titanium tetrabromide or titanium tetraiodide may be present.

Now, referring to the method (B), the solid titanium trichloride may be, for instance, solid titanium trichloride obtained by reducing titanium tetrachloride with hydrogen gas, aluminum or an organic aluminum compound, or the one obtained by pulverizing such solid titanium trichloride in a ball mill. The treatment of the solid titanium trichloride with an ether may be conducted by mixing them by an optional method. Such treatment is usually preferably conducted in the presence of a proper solvent, for instance, a hydrocarbon solvent or a halogenated hydrocarbon solvent in an amount at least twice the amount of the ether, as in the case of the above-mentioned method (A). As the hydrocarbon solvent and the halogenated hydrocarbon solvent, those mentioned above may be used. The solvent is optionally selected depending upon the type of the ether.

The amount of the ether to be used in the method (B) is at least 1, preferably from 1 to 5, in a molar ratio of the ether to titanium trichloride.

The liquid thus obtained is a hydrocarbon-soluble homogeneous solution or mixture of a titanium trichloride-ether complex wherein titanium trichloride formed by the reduction of titanium tetrachloride is complexed with the ether. It is a brown liquid or, depending on the condition, a greenish brown liquid. In certain cases, it may contain a small amount of solid components.

The liquid of titanium trichloride prepared in the above-mentioned methods is subjected to precipitation treatment at a temperature of not higher than 150° C.

There is no particular restriction to the method for obtaining fine solid particles of titanium trichloride from the liquid by the precipitation treatment at a temperature of not higher than 150° C. For instance, the liquid by itself or after adding a hydrocarbon solvent or a halogenated hydrocarbon solvent, is heated to a temperature of not higher than 150° C., usually from 20° to 150° C., preferably from 40° to 120° C., more preferably from 60° to 100° C., for precipitation. In the case where the total mols of titanium in the liquid containing titanium trichloride and aluminum are less than the mols of the ether, a Lewis acid may be added to facilitate the precipitation. The Lewis acid is the one which is capable of reacting with the complex of the titanium trichloride with the ether to precipitate free titanium trichloride. As such a Lewis acid, there may be mentioned a Lewis acid having a stronger acidity than titanium trichloride, such as boron trifluoride, boron trichloride, vanadium tetrachloride, aluminum trichloride, an alkyl aluminum dichloride, an alkyl aluminum susquichloride or a dialkyl aluminum chloride. Among them, an aluminum chloride such as aluminum trichloride or an alkyl aluminum dichloride is preferred.

The freeing agent is used preferably in an amount of not more than 5 times the amount of titanium in the liquid in molar ratio.

In the above-mentioned manner, violet-colored fine solid particles of titanium trichloride are precipitated from the liquid. The violet-colored titanium trichloride thereby precipitated has been confirmed to be δ-type TiCl$_3$ from the X-ray diffraction spectrum.

One of the features of the present invention is that after the amount of the precipitated fine solid particles of titanium trichloride has reached at least 80% based on the total amount of titanium trichloride in the system, titanium tetrachloride is added in an amount within a molar ratio of from 0.2 to 10, preferably from 0.3 to 6, based on the total amount of titanium trichloride in the system. The addition of the titanium tetrachloride may of course be conducted after the precipitation of the fine solid particles of titanium trichloride has been substantially completed. Prior to the addition of the titanium tetrachloride, the titanium tetrachloride concentration in the system (i.e. the concentration of free titanium tetrachloride which is not complexed with the ether) is usually at most about 0.05 in the molar ratio relative to the total amount of the titanium trichloride in the system. (In the above-mentioned method (A), the proportions of the starting materials should be adjusted to bring the titanium tetrachloride concentration after the completion of the reduction to fall within this range.) Namely, titanium tetrachloride is added in such an amount that the titanium tetrachloride concentration in the system becomes to be from 0.2 to 10, preferably from 0.3 to 6 in the molar ratio relative to the total amount of the titanium trichloride in the system.

In the first process of the present invention, the addition of titanium tetrachloride is followed by ageing at a temperature of from 60° to 120° C.

In the second process of the present invention, in addition to the above-mentioned addition of titanium tetrachloride, an ester compound is added when the amount of the precipitated fine solid particles of titanium trichloride has reached at least 60%, preferably from 70 to 90%, based on the total amount of titanium trichloride in the system.

The timing of the addition of titanium tetrachloride and the ester compound is as mentioned above. If titanium tetrachloride is added at a stage where the amount of the precipitated fine solid particles of titanium trichloride is still too small, and if the fine solid particles of titanium trichloride thereby obtained is used as a catalytic component for the polymerization of an α-olefin, it is likely that fine particles will be incorporated in the polymer powder product, such being undesirable. The fine particles in the polymer are likely to deposit, for instance, in a polymer slurry piping or a flash gas piping and thus likely to lead to clogging of the pipings, or they are likely to be a factor impairing the safety for the handling of the polymer powder.

With respect to the ester compounds to be used in the second process of the present invention, the ester compound represented by the general formula I includes hexyl, heptyl, octyl, decyl, dodecyl, tridecyl and octadecyl esters of acrylic acid; hexyl, heptyl, octyl, decyl, dodecyl, tridecyl and octadecyl esters of methacrylic acid; hexyl, heptyl, octyl, decyl, dodecyl, tridecyl and octadecyl esters of crotonic acid; hexyl, heptyl, octyl, decyl, dodecyl, tridecyl and octadecyl esters of isocrotonic acid; hexyl, heptyl, octyl, decyl, dodecyl, tridecyl and octadecyl esters of angelic acid; and hexyl, heptyl, octyl, decyl, dodecyl, tridecyl and octadecyl esters of tiglic acid.

Among these ester compounds, those represented by the general formula I wherein at least one of $R^1$ and $R^2$ is a hydrogen atom and the other is a hydrogen atom or a methyl group, and $R^3$ is an alkyl group having from 6 to 18 carbon atoms, are preferred. Particularly preferred are esters of methacrylic acid, such as hexyl, heptyl, octyl, 2-ethylhexyl, decyl, dodecyl, tridecyl and octadecyl esters of methacrylic acid.

The ester compound represented by the general formula II has, as $R^4$ and $R^5$, saturated or unsaturated aliphatic hydrocarbon groups having from 1 to 50 carbon atoms, aromatic hydrocarbon groups having from 6 to 50 carbon atoms or alicyclic hydrocarbon groups having from 5 to 50 carbon atoms, wherein the sum of the carbon atoms in $R^4$ and $R^5$ is at least 10, preferably from 12 to 50. Specifically, there may be mentioned aromatic carboxylic acid esters such as butylbenzoate, amyl benzoate, hexyl benzoate, octyl benzoate, decyl benzoate, phenyl benzoate, hexyl toluate, octyl toluate, decyl toluate, phenyl toluate, ethylbenzoic acid butyl ester, ethylbenzoic acid amyl ester, ethylbenzoic acid hexyl ester, ethylbenzoic acid octyl ester, ethylbenzoic acid decyl ester, ethylbenzoic acid phenyl ester, trimethylbenzoic acid butyl ester, trimethylbenzoic acid amyl ester, trimethylbenzoic acid hexyl ester, trimethylbenzoic acid octyl ester, trimethylbenzoic acid decyl ester, trimethylbenzoic acid phenyl ester, propylbenzoic acid propyl ester, propylbenzoic acid butyl ester, propylbenzoic acid amyl ester, propylbenzoic acid hexyl ester, propylbenzoic acid octyl ester, propylbenzoic acid decyl ester and propylbenzoic acid phenyl ester; saturated aliphatic carboxylic acid esters such as octyl butyrate, decyl butyrate, hexyl valerianate, octyl valerianate, decyl valerianate, phenyl valerianate, amyl caproate, hexyl caproate, octyl caproate, decyl caproate, phenyl caproate, propyl caprylate, butyl caprylate, amyl caprylate, hexyl caprylate, octyl caprylate, phenyl caprylate, propyl caprate, butyl caprate, amyl caprate, hexyl caprate, octyl caprate, decyl caprate, phenyl caprate, propyl laurate, butyl laurate, amyl laurate, hexyl laurate, octyl laurate, phenyl laurate, propyl palmitate, butyl palmitate, hexyl palmitate, octyl palmitate, phenyl palmitate, ethyl stearate, propyl stearate, butyl stearate, hexyl stearate, octyl stearate and phenyl stearate; and unsaturated aliphatic carboxylic acid esters except the ester compound represented by the general formula 1, such as ethyl oleate, butyl oleate, hexyl oleate, octyl oleate and phenyl oleate. Preferred esters are octylbenzote, decyl benzoate, butyl caprate, decyl caprate, butyl stearate, hexyl stearate, butyl oleate and hexyl oleate.

The ester compound is usually added in an amount within a molar ratio of from 0.02 to 0.5, preferably from 0.03 to 0.3 based on the total amount of titanium trichloride in the system.

With respect to the manner for the addition of titanium tetrachloride, titanium tetrachloride may be added directly as it is, or it may be diluted with a hydrocarbon solvent or a halogenated hydrocarbon solvent before the addition.

When both titanium tetrachloride and the ester compound are to be added, either a method wherein titanium tetrachloride and the ester compound are independently added or a method wherein when the amount of the precipitated fine solid particles of titanium trichloride has reached at least 80%, a mixture of titanium tetrachloride and the ester compound is added. In the former case, there is no particular restriction as to the order for the addition of titanium tetrachloride and the ester compound. In either case, the additives may be diluted with the above-mentioned hydrocarbon solvent before the addition, as the case requires.

For the purpose of the present invention, the amount of the precipitated fine solid particles of titanium trichloride is represented by "%" based on the total amount of titanium trichloride in the system. Here, "the total amount of titanium chloride in the system" is a theoretical total amount on the assumption that all titanium trichloride in the system will eventually completely precipitate as solid particles.

Accordingly, when titanium trichloride is obtained by the reduction of titanium tetrachloride with use of $AlR_nX_{3-n}$ as the reducing agent, the total amount of titanium trichloride in the system corresponds to the molar amount of the feed titanium tetrachloride or the molar amount of R in the reducing agent $AlR_nX_{3-n}$ whichever is smaller. For instance, if 0.4 mol of diethyl aluminum chloride as a reducing agent is fed to 1 mol of the feed TiCl$_4$, the total amount of titanium trichloride in the system equals to 0.8 mol i.e. twice the molar amount of the diethyl aluminum chloride. (In the present invention, titanium chloride is initially in a liquid form and will precipitate substantially in its entirety by the subsequent precipitation treatment.)

The treating time and the treating temperature after the addition of titanium tetrachloride and the ester compound are not critical. However, in order to complete the precipitation of solid titanium trichloride, the system is usually "aged" at a temperature of from 60° to 120° C., preferably from 80° to 100° C. for from 0.1 to 10 hours.

When solid titanium trichloride thus obtained is used together with a co-catalyst for the polymerization of an α-olefin, if unreacted titanium tetrachloride remains in the catalyst, the catalytic activity per solid catalyst decreases, or in the case of slurry polymerization, the quality of the resulting polymer slurry tends to be poor.

Therefore, it is preferred that obtained solid titanium trichloride is washed with a hydrocarbon solvent. Any hydrocarbon solvent may be used for the washing without any particular restriction so long as it is inactive to the catalyst. It is convenient to use the same solvent as used for the polymerization.

Violet-colored fine solid particles of titanium trichloride obtained by the process of the present invention contain a small amount of a complexed ether. However, the aluminum compound component is scarcely detected, and, if present, the amount of aluminum does not exceed 5% by weight relative to titanium.

The fine solid particles of titanium trichloride obtained in the above-mentioned manner is particularly useful as a catalytic component for the polymerization of an α-olefin. Namely, when used in combination with an organic aluminum compound for the polymerization of an α-olefin, it presents a catalyst which exhibits an extremely high catalytic activity and gives an α-olefin polymer having good stereospecificity. When it is used for the polymerization of an α-olefin, there may be used as a co-catalyst an organic aluminum compound represented by the general formula $AlR^9_mY_{3-m}$ where $R^9$ is an alkyl group having from 1 to 8 carbon atoms, m is a number of 1 to 3, and Y is an halogen atom. As such an organic aluminum compound, there may be mentioned a dialkyl aluminum monohalide such as diethyl aluminum monochloride, dimethyl aluminum monochloride, di-n-propyl aluminum monochloride, di-n-butyl aluminum monochloride or di-n-hexyl alminum monochloride. Among them, a compound wherein $R^9$ is n-propyl or n-hexyl, Y is chlorine and m is from 1.95 to 2.10, is preferred as it has a particularly high catalytic activity for the polymerization and gives an α-olefin polymer having extremely good stereospecificity.

For the polymerization of an α-olefin, it is possible to use, in addition to the above-mentioned solid titanium trichloride and the co-catalyst, an electron donative compound as a third catalytic component. As such as electron donative compound, there may be mentioned an trialkyl phosphate, an triaryl phosphite or a carboxylic acid ester.

With respect to the proportions of the catalytic components, a molar ratio of titanium trichloride:organic aluminum compound is selected usually within a range of from 1:1 to 1:100, preferably from 1:2 to 1:40. When the third catalytic component is used, the molar ratio of titanium trichloride:third catalytic component is selected usually within the range of from 1:0.01 to 1:10, preferably from 1:0.05 to 1:2.

As the α-olefin to be polymerized, there may be mentioned propylene, butene-1 or 4-methyl pentene-1. The catalyst may be used for the homopolymerization of these α-olefins, the copolymerization of these α-olefins with ethylene or the copolymerization of these α-olefins with one another. The catalyst of the present invention is particularly suitable for use in the stereospecific polymerization for the production of a propylene homopolymer, a random copolymer containing at least 90% by weight of propylene or a block copolymer containing at least 80% by weight of propylene. The polymerization reaction may be conducted by vapour phase polymerization or by slurry polymerization in the presence of a diluent such as pentane, hexane, heptane or liquid propylene. The polymerizacion temperature or pressure is not critical. However, the polymerization is usually conducted at a temperature of from 30° to 100° C., preferably from 50° to 90° C. under a pressure of from the atmospheric pressure to 100 atm. Further, for the polymerization, a conventional molecular weight controlling agent such as hydrogen or a halogenated hydrocarbon may be used. Now, present invention will be described in further detail with reference to Examples and Comparative Examples. In Examples and Comparative Examples, the catalytic efficiency (CE) represents the yield (g) of polypropylene per gram of titanium atoms in violet-colored solid titanium trichloride. Further, the catalytic activity (K) represents the yield (g) of polypropylene per gram of titanium atoms per hour per propylene pressure of 1 kg/cm². The values of CE and K were calculated based on the Ti content which was obtained by quantitative analysis by the fluorescent X-ray analysis (hereinafter referred to as FX-analysis) of a pressed piece prepared from the polymer powder product. The isotactic index (II) represents the residual amount (% by weight) when the polymer product was extracted by boiling n-heptane for 6 hours by means of an improved type Soxhlet's extractor. The melt flow index (MFI) was measured in accordance with ASTM-D 1238. FR is a simple index showing the degree of the molecular weight distribution and is represented by a ratio of the extruded amount of the molten polymer at 230° C. under a load of 5.528 kg to the extruded amount of the same polymer at 230° C. under a load of 0.553 kg. The greater the value FR, the wider the molecular weight distribution.

The particle size of the polymer powder was measured by a sieving classification method. The surface area was determined by a low temperature gas adsorption method ($N_2$) of a constant volume multi-point system (BET) by means of a Kinoshita surface area measuring apparatus (BET method). X-ray diffraction was measured under the following conditions by means of Rotor Flex 200 PL (trade name) manufactured by Rigaku Denki K.K.:
Cu-K$\alpha$
Tube voltage: 40 KD
Tube current: 180 mA
Full scale: $1 \times 10^3$ count per sec.
Time constant: 2.0
Scanning speed: 2°/min.

EXAMPLE 1

(A) Preparation of violet-colored solid titanium trichloride

Into a four-necked flask having a capacity of 500 ml and flashed with dry nitrogen, 165 ml of purified benzene and 165 mol of titanium tetrachloride were fed, and 165 mmol of di-n-butylether was further added. Titanium tetrachloride and di-n-butylether were reacted with slight heat generation and homogeneously dissolved in benzene, whereby a homogeneous orange-yellow solution was obtained. While maintaining the solution at 30° C. under stirring, 82.5 mmol of diethyl aluminum monochloride was gradually added thereto, whereby a homogeneous blackish brown solution of titanium trichloride was obtained. The homogeneous solution of titanium trichloride was held at 30° C. for 30 minutes, and then it was heated to 40° C. and stirred for 2 hours, whereby precipitation of reddish violet-colored titanium trichloride was observed. The amount of the precipitated violet-colored solid titanium trichloride at this stage was 85% by weight according to the result of a separate experiment conducted under the same condition. (As calculated from the amount of the feed materials, the titanium tetrachloride concentration was not more than 0.05 in the molar ratio relative to the total amount of the titanium trichloride in the system.) At this stage, 82.5 mmol (a molar ratio of 0.5 based on the total amount of $TiCl_3$) of titanium tetrachloride was further added, and the temperature was raised to 95° C. and the stirring was continued for 1 hour. Then, the precipitates were collected by filtration and washed 4 times with 300 ml of benzene, whereupon 25.9 g of violet-colored fine particles of titanium trichloride catalyst was obtained.

(B) Polymerization of propylene

Into an induction stirring-type autoclave having a capacity of 2 l and flashed with nitrogen, 1.3 mmol of di-ethyl aluminum monochloride was fed and then 1.2 kg/cm² of hydrogen gas and 700 g of liquid propylene were fed. The autoclave was heated, and when the internal temperature reached 70° C., the fine solid particles of titanium trichloride obtained by the above (A) was introduced with nitrogen in an amount of 25 mg as $TiCl_3$, whereupon the polymerization reaction was initiated. Three hours later, unreacted propylene was swiftly purged and the reaction mixture was allowed to cool, whereupon 382 g of polypropylene was obtained as white powder. The Ti content in the polymer was 20 ppm as measured by a fluorscent X-ray analysis, and CE=50,000, K=589 and II=98.9%. The average particle size of the polymer powder was 350 μm, and no fine particles having a particle size of less than 100 μm was observed.

REFERENCE EXAMPLE 1

In Example 1(A), when the treatment was carried out at 40° C. for 2 hours, violet-colored solid titanium trichloride was withdrawn and washed in the same manner as in Example 1(A). The surface area of this solid titanium trichloride was 3 m²/g as measured by the BET method. From the X-ray diffraction spectrum (Cu.K$\alpha$), no peak was observed at $2\theta = 15°-17°$, whereby it was judged to be $\delta$-$TiCl_3$ having extremely weak peaks.

Further, the polymerization of propylene was conducted in the same manner as in Example 1(B) by using this solid titanium trichloride, whereupon 320 g of polypropylene was obtained as white powder. In this case, CE=41,200, K=485 and II=89%.

REFERENCE EXAMPLE 2

Into a four-necked flask having a capacity of 500 ml and flashed with dry nitrogen, 75 ml of n-hexane and 0.17 mol of titanium tetrachloride were fed. While maintaining this hexane solution of $TiCl_4$ at 30° C. under stirring, a solution comprising 113 ml of n-hexane and 0.35 mol of diethyl aluminum monochloride was added in 30 minutes. Then, the temperature was raised to 65° C. and the treatment was continued for 120 minutes. The reaction product was washed 5 times with 300 ml of n-hexane. The brown solid titanium trichloride thereby obtained had a surface area of 20 m²/g as measured by the BET method. From the X-ray diffraction spectrum, a sharp peak at $2\theta = 16.2°$ which is typical to $\beta$-TiCl$_3$ was observed.

Further, the polymerization of propylene was conducted in the same manner as in Example 1(B) by using this solid titanium trichloride, whereupon 62 g of viscous polymer was obtained. CE=7,970, K=93.3 and II=42.3%.

REFERENCE EXAMPLE 3

Into a four-necked flask having a capacity of 500 ml and flashed with dry nitrogen, 150 ml of n-hexane and 0.34 mol of titanium tetrachloride were fed. This solution was cooled to 1° C., and a solution comprising 113 ml of n-hexane and 0.35 mol of diethyl aluminum monochloride was gradually added thereto in 240 minutes. Then, the temperature was raised to 65° C. in 1 hour, and the stirring was continued for further 1 hour. Then, the reaction product was washed 5 times with 300 ml of n-hexane. The solid titanium trichloride thereby obtained was brown and had a surface area of 8 m²/g as measured by the BET method.

Further, the polymerization of propylene was conducted in the same manner as in Example 1(B) by using this titanium trichloride, whereupon 57 g of polymer was obtained. CE=7,330, K=86 and II=56%.

From Reference Examples 1 to 3 and Example 1, it is evident that in the process for the production of titanium trichloride according to the present invention, violet-colored ($\delta$-) TiCl$_3$ is precipitated directly, i.e. not indirectly from brown-colored ($\beta$-) TiCl$_3$ by way of crystal transformation to $\delta$-form.

REFERENCE EXAMPLE 4

28.5 g of the reduced solid obtained in Reference Example 3 was suspended in 172 ml of n-hexane, and 25.6 ml of di-isoamyl ether was added thereto. The stirring was continued at 35° C. for 1 hour. Then, the solid thereby obtained was washed 5 times with 300 ml of n-hexane.

This treated solid was suspended in 85 ml of a n-hexane solution containing 40% by volume of TiCl$_4$, and the suspension was stirred at 65° C. for 2 hours. The product was washed 5 times with 500 ml of n-hexane (room temperature), and further washed once with 500 ml of hexane at 65° C., whereupon 26 g of a solid catalyst complex was obtained.

With use of this catalyst complex, the polymerization of propylene was conducted in the same manner as in Example 1(B), whereby 280 g of polypropylene was obtained as white powder. In this case, CE=36,000, K=420 and II=91.5%.

COMPARATIVE EXAMPLE 1

Violet-colored solid titanium trichloride was obtained in the same manner as in Example 1(A) except that no additional TiCl$_4$ was added. With use of this solid titanium trichloride, the polymerization of propylene was conducted in the same manner as in Example 1(B).

The polymer thereby obtained was subjected to the same measurements as in Example 1. The results thereby obtained are shown in Table 1.

EXAMPLES 2 TO 5

The operation of Example 1 was repeated except that toluene was used instead of benzene used in Example 1 and the amount of addition of TiCl$_4$ was varied to a molar ratio of added TiCl$_4$ to the total amount of TiCl$_3$ being 0.1, 0.3, 1.0 and 6.0. The polymer thereby obtained was subjected to the same measurements as in Example 1. The results thereby obtained are shown in Table 1.

COMPARATIVE EXAMPLE 2

Example 1 was repeated except that toluene was used instead of benzene used in Example 1 and the timing of the addition of TiCl$_4$ was changed to immediately after the temperature rise to 40° C. (the amount of precipitated TiCl$_3$: 48% by weight). The polymer thereby obtained was subjected to the same measurements as in Example 1. The results thereby obtained are shown in Table 1.

EXAMPLE 6

(A) Preparation of violet-colored solid titanium trichloride

Into an autoclave having a capacity of 10 l and flashed with nitrogen, 5.0 l of n-hexane and 3.0 mols of titanium tetrachloride were fed, and 2.7 mols of di-n-octyl ether was further added. While maintaining the mixture at 25° C. under stirring, 1.0 mol of diethyl aluminum monochloride dissolved in 5.0 l of n-hexane was gradually added to obtain a uniform solution of blackish brown titanium trichloride.

This titanium trichloride solution was heated to 95° C. in about 2 hours, whereby precipitation of violet-colored titanium trichloride was observed after an intermediate point during the temperature rise. When the temperature reached 95° C., 0.5 mol of titanium tetrachloride was added afresh, and the stirring was continued at 95° C. for further 1 hour. From a separate experiment, the amount of the precipitated titanium trichloride at the stage where the temperature reached 95° C. was found to be 85% by weight relative to the reduced equivalent of diethyl aluminum monochloride.

Then, the precipitates were collected by filtration and washed repeatedly with n-hexane, whereupon violet-colored fine solid particles of titanium trichloride catalyst were obtained.

(B) Polymerization of propylene

With use of the violet-colored solid titanium trichloride obtained in the above (A), the polymerization of propylene was conducted in the same manner as in Example 1(B).

The polymer thereby obtained was subjected to the same measurements as in Example 1. The results thereby obtained are shown in Table 1.

COMPARATIVE EXAMPLE 3

Violet-colored solid titanium trichloride was prepared in the same manner as in Example 6(A) except that no additional titanium tetrachloride was added.

With use of the solid titanium trichloride thereby obtained, the polymerization of propylene was conducted in the same manner as in Example 1(B).

The polymer thereby obtained was subjected in the same measurements as in Example 1. The results thereby obtained are shown in Table 1.

TABLE 1

| Examples | Addition of TiCl4 | | Physical properties of polymers | | | | | | | |
|---|---|---|---|---|---|---|---|---|---|---|
| | Amount of precipitated TiCl3 at the time of the addition (%) | Amount* | Ti content (ppm) | CE (g polymer/ g Ti) | K (g polymer/ g Ti · hr · kg/cm$^2$) | II (%) | MFI (g/10 min.) | FR | Average particle size (μm) | Fine particles (% by weight) |
| Example 1 | 85 | 0.5 | 20.0 | 50000 | 589 | 98.9 | 10.2 | 39 | 350 | None (less than 0.01) |
| Comparative Example 1 | — | — | 21.1 | 47500 | 555 | 96.8 | 9.8 | 38 | 320 | 0.2 |
| Example 2 | 85 | 0.1 | 20.8 | 48000 | 560 | 97.1 | 7.6 | 37 | 350 | 0.1 |
| Example 3 | 85 | 0.3 | 20.1 | 49800 | 581 | 98.5 | 8.3 | 38 | 340 | 0.1 |
| Example 4 | 85 | 1.0 | 19.9 | 50100 | 585 | 98.8 | 9.2 | 39 | 300 | 0.1 |
| Example 5 | 85 | 6.0 | 29.2 | 34300 | 400 | 99.0 | 8.6 | 38 | 220 | 0.1 |
| Comparative Example 2 | 48 | 1.0 | 19.9 | 50200 | 586 | 98.5 | 9.8 | 37 | 330 | 0.5 |
| Example 6 | 85 | 0.5 | 21.0 | 47600 | 556 | 98.1 | 11.2 | 39 | 230 | 0.05 |
| Comparative Example 3 | — | — | — | 47200 | 551 | 96.3 | 10.9 | 39 | 240 | 0.1 |

*The molar ratio to the total amount of TiCl3

EXAMPLE 7

In Example 1(A), when the treatment was conducted at 40° C. for 2 hours, (the amount of the precipitated reddish violet-colored titanium trichloride: 85% by weight), 82.5 mmol of titanium tetrachloride (the molar ratio to the total amount of TiCl3 in the system: 0.5) and 8.3 mmol of dodecyl methacrylate (the molar ratio to the total amount of TiCl3 in the system: 0.05) were successively added. The mixture was heated to 95° C. and stirred for 1 hour. Then, the precipitates were collected by filtration and washed 4 times with 300 ml of benzene, whereupon 25.9 g of violet-colored fine solid particles of titanium trichloride catalyst were obtained. The specific surface areas of the particles was 5 m$^2$/g as measured by the BET method.

The polymerization of propylene was conducted in the same manner as in Example 1(B) except that the violet-colored fine solid particles of titanium trichloride thereby obtained was used, whereby 374 g of polypropylene was obtained as white powder.

The Ti content in the polymer was 20 ppm as measured by a fluorescent X-ray analysis, and CE=50000, K=583, II=99.4%, MFI=8.3 and FR=39. Further, the average particle size of the polymer powder was 320 μm and no fine particles having a particle size of less than 100 μm was observed.

COMPARATIVE EXAMPLE 4

Example 7 was repeated except that the timing of the addition of titanium tetrachloride and tridecyl methacrylate was changed to immediately after the temperature rise to 40° C. (the amount of precipitated TiCl3: 48% by weight).

The polymer thereby obtained was subjected to the same measurements as in Example 7. The results thereby obtained are shown in Table 2.

COMPARATIVE EXAMPLE 5

Example 7 was repeated except that after the temperature was raised to 40° C., no titanium tetrachloride was added and only tridecyl methacrylate was added. The specific surface area of the violet-colored solid titanium trichloride thereby obtained was 12 m$^2$/g as measured by the BET method. With use of this product, the polymerization of propylene was conducted in the same manner as in Example 7.

The polymer thereby obtained was subjected to the same measurements as in Example 7. The results thereby obtained are shown in Table 2.

EXAMPLE 8

Violet-colored solid titanium trichloride was prepared in the same manner as in Example 7 except that 8.3 mmol of n-octyl methacrylate was added instead of tridecyl methacrylate.

The specific surface area of the solid titanium trichloride thereby obtained was 7 m$^2$/g as measured by the BET method.

With use of this product, the polymerization of propylene was conducted in the same manner as in Example 7.

The polymer thereby obtained was subjected to the same measurements as in Example 7. The results thereby obtained are shown in Table 2.

EXAMPLES 9 AND 10

Violet-colored solid titanium trichloride was prepared in the same manner as in Example 7 except that the amounts of addition of titanium tetrachloride and tridecyl methacrylate were varied.

The specific surface area of each of the solid titanium trichlorides thereby obtained was not more than 5 m$^2$/g.

With use of these solid titanium trichlorides, the polymerization of propylene was conducted in the same manner as in Example 7. The results thereby obtained are shown in Table 2.

TABLE 2

| Examples | Amount of precipitated TiCl₃ at the time of the addition (%) | TiCl₄ Amount* | Ester Compound Kind | Ester Compound Amount* | Ti content (ppm) | CE (g polymer/ g Ti) | K (g polymer/ g Ti · hr · kg/cm²) | II (%) | MFI (g/10 min.) | FR | Average particle size (μm) | Fine particles (% by weight) |
|---|---|---|---|---|---|---|---|---|---|---|---|---|
| Example 7 | 85 | 0.5 | Tridecyl methacrylate | 0.05 | 20.0 | 50000 | 583 | 99.4 | 8.3 | 39 | 320 | None |
| Comparative Example 4 | 48 | 0.5 | Tridecyl methacrylate | 0.05 | 20.1 | 49700 | 580 | 98.9 | 9.2 | 39 | 310 | 0.6 |
| Comparative Example 5 | 48 | — | Tridecyl methacrylate | 0.05 | 22.2 | 45000 | 520 | 97.8 | 8.9 | 39 | 300 | 0.1 |
| Example 8 | 85 | 0.5 | n-Octyl methacrylate | 0.05 | 19.6 | 51000 | 588 | 99.2 | 10.2 | 39 | 320 | None |
| Example 9 | 85 | 0.5 | Tridecyl methacrylate | 0.15 | 23.0 | 43500 | 510 | 99.2 | 9.0 | 39 | 300 | 0.2 |
| Example 10 | 85 | 0.3 | Tridecyl methacrylate | 0.2 | 27.0 | 37000 | 433 | 99.0 | 7.8 | 39 | 280 | 0.4 |

*The molar ratio to the total amount of TiCl₃

I claim:

1. A process for preparing solid titanium trichloride which is useful for the polymerization of an α-olefin, which comprises:
(a) precipitating violet-colored, fine, solid particles of titanium trichloride from a liquid medium containing titanium trichloride liquefied in the presence of an ether at a temperature of no more than 150° C. under the condition that after at least 80%, based on the total amount of titanium trichloride in the system, of the violet-colored, fine, solid particles of titanium trichloride have precipitated, titanium tetrachloride is added to said liquid medium in an amount such that the molar ratio of titanium tetrachloride to the total amount of titanium trichloride in the system ranges from 0.2 to 10; and
(b) aging the precipitated particles at a temperature of from 60° to 120° C.

2. The process of claim 1, wherein the molar ratio of titanium tetrachloride to titanium trichloride in step (a) ranges from 0.3 to 6.

3. The process of claim 1, wherein said liquid medium containing titanium trichloride is prepared by reducing titanium tetrachloride with an organoaluminum compound in the presence of an ether, and wherein said violet-colored, fine, solid particles of titanium trichloride are precipitated from said liquid medium at a temperature of from 20° to 150° C.

4. The process of claim 3, wherein the reduction of said titanium tetrachloride with said organoaluminum compound occurs in the presence of a solvent.

5. The process of claim 1, wherein said aging step (b) is conducted at a temperature of from 80° to 100° C.

6. A process for preparing solid titanium trichloride which is useful for the polymerization of an α-olefin, which comprises:
(a) precipitating violet-colored, fine, solid particles of titanium trichloride from a liquid medium containing titanium trichloride liquefied in the presence of an ether at a temperature of no more than 150° C. under the condition that after at least 80%, based on the total amount of titanium trichloride in the system, of the violet-colored, fine, solid particles of titanium trichloride have precipitated, titanium tetrachloride is added to said liquid medium in an amount such that the molar ratio of titanium tetrachloride to the total amount of titanium trichloride in the system ranges from 0.2 to 10, and under the condition that after at least 60%, based on the total amount of titanium trichloride in the system, of said violet-colored, fine, solid particles of titanium trichloride precipitate from said liquid medium, an ester compound of the formula (I):

$$\begin{array}{cc} R^1 & R^2 \\ | & | \\ CH=C-COOR^3 \end{array} \quad (I)$$

wherein $R^1$ and $R^2$ each independently is hydrogen or an alkyl group of from 1 to 3 carbon atoms and $R^3$ is an alkyl group having at least 6 carbon atoms, and/or an ester compound of the formula (II):

$$\begin{array}{c} R^4-C-O-R^5 \\ \parallel \\ O \end{array} \quad (II)$$

wherein $R^4$ and $R^5$ each independently is a hydrocarbon radical, provided that the sum of the carbon atoms in $R^4$ and $R^5$ is at least 10, is added to said liquid medium.

7. The process of claim 6, wherein said ester compound of formula (I) has the formula:

$$\begin{array}{c} CH_3 \\ | \\ CH_2=C-COOR^3 \end{array}$$

wherein $R^3$ is an alkyl group of 6 to 18 carbon atoms.

8. The process of claim 6, wherein said ester compound of formula (II) has the formula:

$$\begin{array}{c} R^4-C-O-R^5 \\ \parallel \\ O \end{array}$$

wherein $R^4$ and $R^5$ each independently is a hydrocarbon radical with the sum of the carbon atoms in groups $R^4$ and $R^5$ being at least 12.

9. The process of claim 6, wherein the total amount of ester compound added to said liquid medium is such that the molar ratio of ester compound to the total amount of titanium trichloride in the system ranges from 0.02 to 0.5.

10. The process of claim 6, wherein the ester compound is added to said liquid medium when from 70 to 90% by weight of the violet-colored, fine, solid particles of titanium trichloride have precipitated from said system.

11. The process of claim 6, wherein the molar ratio of titanium tetrachloride added to said system to the total amount of titanium trichloride in the system ranges from 0.3 to 6.

12. The process of claim 6, wherein said liquid medium containing titanium trichloride is prepared by reducing titanium tetrachloride with an organoaluminum compound in the presence of an ether, and wherein said violet-colored, fine, solid particles of titanium trichloride are precipitated from said liquid medium at a temperature of from 20° to 150° C.

* * * * *